United States Patent
Endo et al.

(10) Patent No.: US 9,692,286 B2
(45) Date of Patent: Jun. 27, 2017

(54) VIBRATION ACTUATOR

(71) Applicant: NIDEC COPAL CORPORATION, Tokyo (JP)

(72) Inventors: Masaya Endo, Tokyo (JP); Yoshihide Tonogai, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 177 days.

(21) Appl. No.: 13/954,777

(22) Filed: Jul. 30, 2013

(65) Prior Publication Data

US 2014/0035397 A1 Feb. 6, 2014

(30) Foreign Application Priority Data

Jul. 31, 2012 (JP) ................. 2012-170333

(51) Int. Cl.
*H02K 33/18* (2006.01)
*H02K 33/16* (2006.01)

(52) U.S. Cl.
CPC ............. *H02K 33/18* (2013.01); *H02K 33/16* (2013.01)

(58) Field of Classification Search
CPC ............................... H02K 33/18; H02K 33/16
USPC .......................................... 310/30, 12.16, 20
See application file for complete search history.

(56) References Cited

U.S. PATENT DOCUMENTS

| | | | | |
|---|---|---|---|---|
| 2,949,909 A | * | 8/1960 | Macchioni | B25D 11/064 173/117 |
| 3,903,438 A | * | 9/1975 | Dolz | 310/27 |
| 4,121,125 A | * | 10/1978 | Dolz | 310/27 |
| 4,215,297 A | * | 7/1980 | Jacquemet | B25D 11/064 310/30 |
| 5,434,549 A | * | 7/1995 | Hirabayashi | 335/229 |
| 6,037,852 A | * | 3/2000 | Pfab | 335/274 |
| 7,078,832 B2 | * | 7/2006 | Inagaki | 310/12.19 |
| 7,495,358 B2 | * | 2/2009 | Kobayashi | 310/36 |
| 7,841,972 B1 | | 11/2010 | Huang et al. | |
| 7,911,098 B2 | * | 3/2011 | Lee et al. | 310/81 |
| 8,937,411 B2 | * | 1/2015 | Kim et al. | 310/15 |
| 2002/0195884 A1 | * | 12/2002 | Ichii | 310/15 |

(Continued)

FOREIGN PATENT DOCUMENTS

| | | |
|---|---|---|
| JP | 10-9337 | 1/1998 |
| JP | 2003-220363 | 8/2003 |

(Continued)

*Primary Examiner* — Alex W Mok

(74) *Attorney, Agent, or Firm* — Troutman Sanders LLP

(57) ABSTRACT

A first weight portion of a vibration actuator includes an inner-side enlarged portion that protrudes from an end portion of a solid head in a direction of a vibration axis and that is inserted into an opening portion extending within a first compression coil spring along the direction of the vibration axis. An outer peripheral surface of the inner-side enlarged portion becomes continuously smaller in diameter from a base end towards a free end, with the vibration axis being the center of the diameter. That is, the inner-side enlarged portion has the shape of a truncated cone. The inner-side enlarged portion is inserted into the opening portion of the first compression coil spring and the opening portion is utilized to change the length of the inner-side enlarged portion in the direction of the vibration axis, thereby changing the mass of the first weight portion.

4 Claims, 12 Drawing Sheets

(56) References Cited

U.S. PATENT DOCUMENTS

| | | | |
|---|---|---|---|
| 2003/0142845 A1* | 7/2003 | Miyamoto | H02K 33/16 |
| | | | 381/396 |
| 2007/0040457 A1* | 2/2007 | Shimizu | 310/15 |
| 2007/0145832 A1* | 6/2007 | Shimizu | 310/15 |
| 2008/0284261 A1* | 11/2008 | Andrieux | 310/30 |
| 2009/0085359 A1* | 4/2009 | Mabuchi | 290/1 R |
| 2011/0012441 A1* | 1/2011 | Oh | 310/25 |
| 2011/0062804 A1* | 3/2011 | Lee | 310/30 |
| 2011/0101799 A1* | 5/2011 | Woo et al. | 310/30 |
| 2011/0133577 A1* | 6/2011 | Lee | 310/15 |
| 2011/0239383 A1* | 10/2011 | Nishiura | 15/22.1 |

FOREIGN PATENT DOCUMENTS

| | | | |
|---|---|---|---|
| JP | 2004-33930 | 2/2004 | |
| JP | 2004033930 A * | 2/2004 | B06B 1/04 |
| JP | 2004-73983 | 3/2004 | |
| JP | 2012-16153 | 1/2012 | |

* cited by examiner

VIBRATION ACTUATOR

CROSS REFERENCES TO RELATED APPLICATIONS

The present invention contains subject matter related to Japanese Patent Application No. 2012-170333 filed in the Japan Patent Office on Jul. 31, 2012, the entire contents of which are incorporated herein by reference.

BACKGROUND OF THE INVENTION

1. Field of the Invention

The present invention relates to a small vibration actuator used in, for example, a vibration generating source for notifying a user of an incoming call of a portable wireless device such as a cellular phone, or a vibration generating source for providing tactile sensation of a touch panel of a portable wireless device or reality of a game played by a game device to a user's finger or hand.

2. Description of the Related Art

Hitherto, as a technology in such a field, the technology described in Japanese Unexamined Patent Application Publication No. 2003-220363 (PTL 1) is provided. The vibration actuator described in PTL 1 includes a cup-shaped yoke in a housing (frame). A circular cylindrical magnet is secured to one side of a bottom portion of the yoke and a weight is secured to the other side of the bottom portion of the yoke. A coil is disposed between the magnet and the yoke. In a direction of a vibration axis, a first compression coil spring is disposed between an end portion of the housing and the weight, and a second compression coil spring is disposed between the housing and an open-side end portion of the yoke. By interposing the weight and the yoke between the first compression coil spring and the second compression coil spring in this way, the vibration actuator is reduced in size. In order to prevent rattling of the first compression coil spring, the weight is provided with a protrusion that is fitted into an end portion of the first compression coil spring.

However, in the aforementioned existing vibration actuator, since, in order to prevent rattling of the first compression coil spring, the protrusion of the weight is fitted into the first compression coil spring, an outer peripheral surface of the protrusion of the weight continues contacting an end portion of an inner peripheral surface of the first compression coil spring that is repeatedly stretched and contracted when the weight vibrates. As a result, the first compression coil spring that is repeatedly stretched and contracted when the weight vibrates rubs against or collides with the outer peripheral surface of the protrusion. This may generate abnormal noise from the first compression coil spring at a portion where the first compression coil spring contacts the outer peripheral surface of the protrusion. Further, when the first compression coil spring rubs against or collides with the protrusion, the amplitude of vibration of the weight is affected, thereby causing the vibration quantity to become changeable. In particular, such a problem tends to occur in a small vibration actuator because the wire diameter of the compression coil spring is very small and the compression coil spring, itself, is easily twisted.

With regard to the weight disclosed in PTL 1, there is no technical idea of effectively using the protrusion of the weight as a portion of the weight, and a spring seat is merely formed by forming an end portion of the weight into a concave shape. The evidence for this is that even an end portion of the second compression coil spring that is disposed between the housing and the open-side end portion of the yoke is held by a spring seat having the same shape as the spring seat of the first compression coil spring.

SUMMARY OF THE INVENTION

Accordingly, it is an object of the present invention to provide a vibration actuator that can prevent abnormal noise from being generated and that can achieve stable vibration.

According to an aspect of the present invention, there is provided a vibration actuator in which a magnet vibrates linearly in a housing along a vibration axis as a result of cooperation of a coil and the magnet. The vibration actuator includes the housing, the coil that is disposed in the housing, the magnet that is surrounded by the coil, and a weight that vibrates together with the magnet along the vibration axis. The weight includes a weight body portion and an inner-side enlarged portion. The weight body portion is urged by a compression coil spring disposed along the vibration axis. The inner-side enlarged portion has an outer peripheral surface, protrudes from the weight body portion in a direction of the vibration axis, and is inserted into an opening portion extending within the compression coil spring along the direction of the vibration axis. The outer peripheral surface of the inner-side enlarged portion becomes smaller in diameter from a base end towards a free end, the vibration axis being a center of the diameter.

The weight that is applied to the vibration actuator includes an inner-side enlarged portion that protrudes from the weight body portion in the direction of the vibration axis. The inner-side enlarged portion is inserted into an opening portion of the compression coil spring, and this opening portion is utilized to change the length of the inner-side enlarged portion in the direction of the vibration axis, so that the mass of the weight is changed. Moreover, considering that the length of the inner-side enlarged portion in the opening portion of the compression coil spring is changed, the inner-side enlarged portion is made smaller in diameter from the base end towards the free end, with the vibration axis being the center of the diameter. Therefore, even if the weight is made heavy, the compression coil spring that is repeatedly stretched and contracted when the weight vibrates is less likely to rub against or to collide with the inner-side enlarged portion. As a result, the compression coil spring is less likely to generate abnormal noise. In addition, when the first compression coil spring rubs against or collides with the inner-side enlarged portion, the amplitude of vibration of the weight is affected, thereby causing the vibration quantity to become changeable. However, such a problem is less likely to occur. Further, in the small vibration actuator including a compression coil spring having a very small wire diameter, the compression coil spring, itself, is easily twisted. Therefore, the above-described structure is a very effective structure.

The weight may further include an outer-side enlarged portion that protrudes from the weight body portion at an outer side of the compression coil spring in the direction of the vibration axis.

When such a structure is used, by simply changing the protruding amount of the outer-side enlarged portion, it is possible to easily change the mass of the weight, and to, coupled with a change in the length of the inner-side enlarged portion, considerably increase design flexibility in terms of the mass of the weight.

The outer-side enlarged portion may have an inner peripheral surface that becomes larger in diameter from a base end towards a free end, the vibration axis being a center of the diameter, the inner peripheral surface facing the compression coil spring.

When such a structure is used, the compression coil spring that is repeatedly stretched and contracted when the weight vibrates is less likely to rub against or to collide with the outer-side enlarged portion similarly to the case in which it is less likely to rub against or to collide with the inner-side enlarged portion. Therefore, the compression coil spring is less likely to generate abnormal noise. Further, when the compression coil spring rubs against or collides with the outer-side enlarged portion, the amplitude of vibration of the weight is affected, as a result of which the vibration quantity tends to be changeable. However, such a problem is less likely to occur.

According to another aspect of the present invention, there is provided a vibration actuator in which a magnet vibrates linearly in a housing along a vibration axis as a result of cooperation of a coil and the magnet. The vibration actuator includes the housing, the coil that is disposed in the housing, the magnet that is surrounded by the coil, and a weight that vibrates together with the magnet along the vibration axis. The weight includes a weight body portion and an inner-side enlarged portion. The weight body portion is urged by a compression coil spring disposed along the vibration axis. The inner-side enlarged portion has an outer peripheral surface, protrudes from the weight body portion in a direction of the vibration axis, and is inserted into an opening portion extending within the compression coil spring along the direction of the vibration axis. The outer peripheral surface of the inner-side enlarged portion is smaller in diameter at a free end side than at a base end side, the vibration axis being a center of the diameter.

According to present invention, it is possible to prevent abnormal noise from being generated, and to achieve stable vibration.

DESCRIPTION OF THE PREFERRED EMBODIMENTS

Preferred embodiments of a vibration actuator according to the present invention are hereunder described in detail with reference to the drawings.

Figure 1:
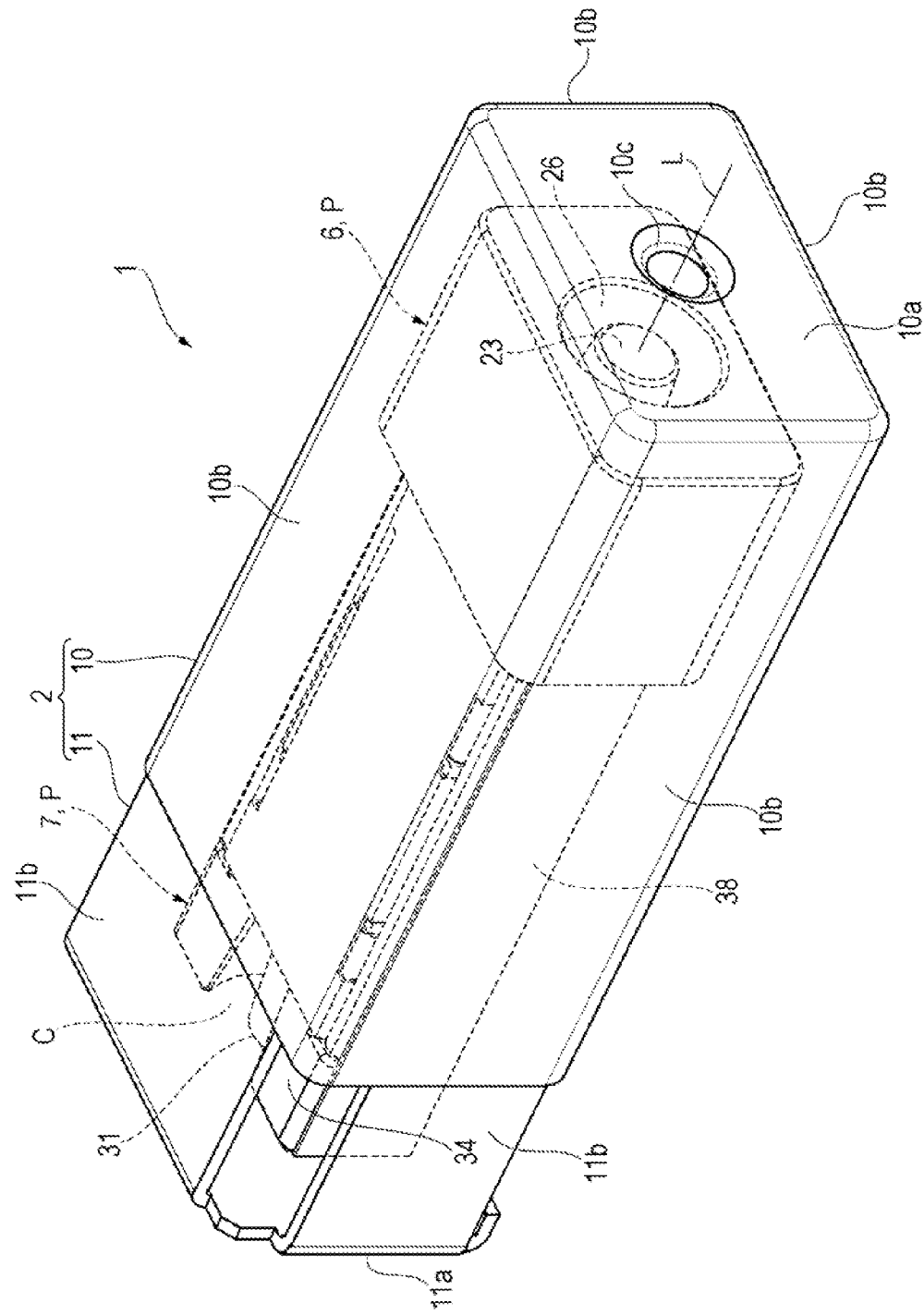
FIG. 1 is an external perspective view of a vibration actuator according to an embodiment of the present invention.
Figure 2:
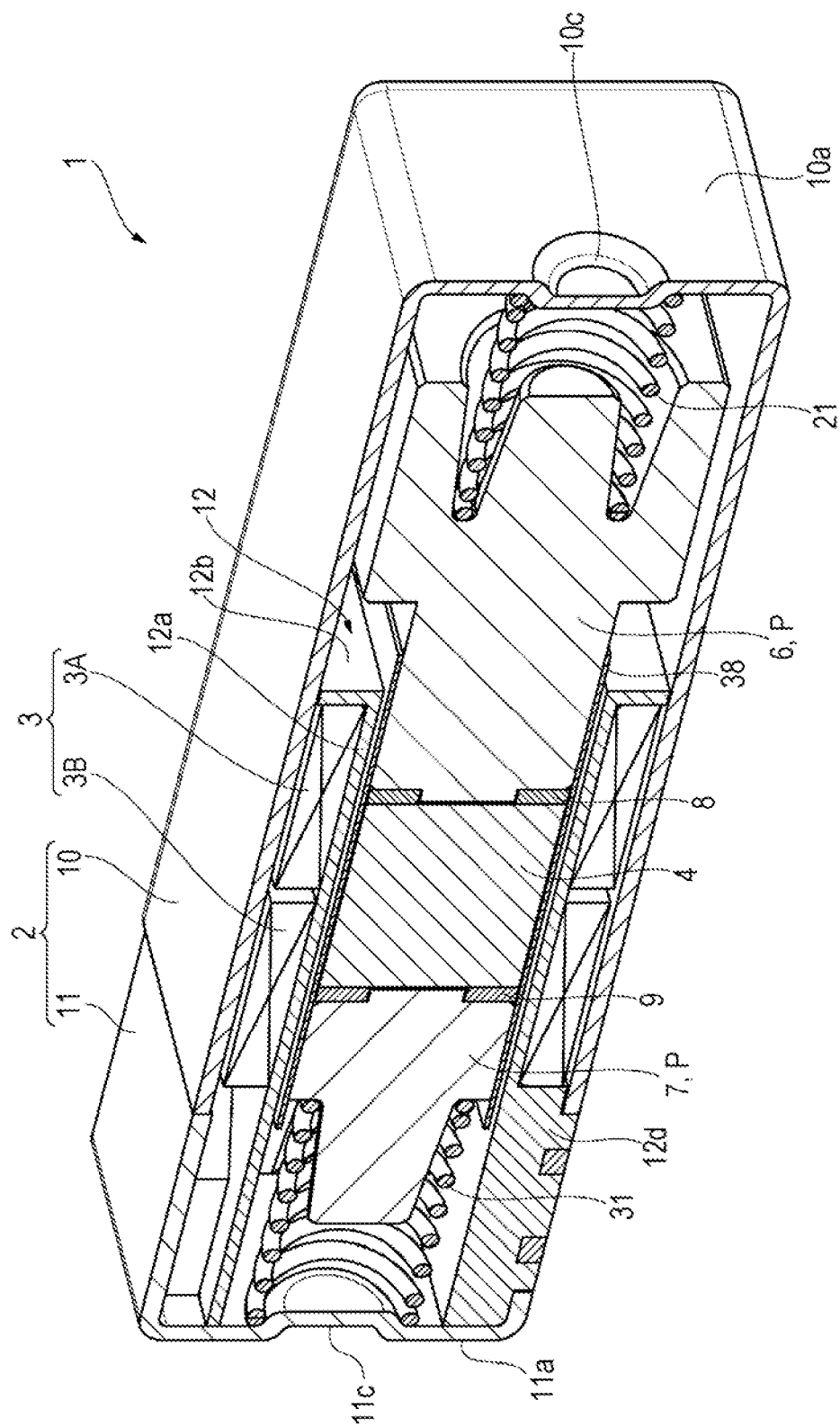
FIG. 2 is a half sectional perspective view of the vibration actuator shown in FIG. 1.
Figure 3:
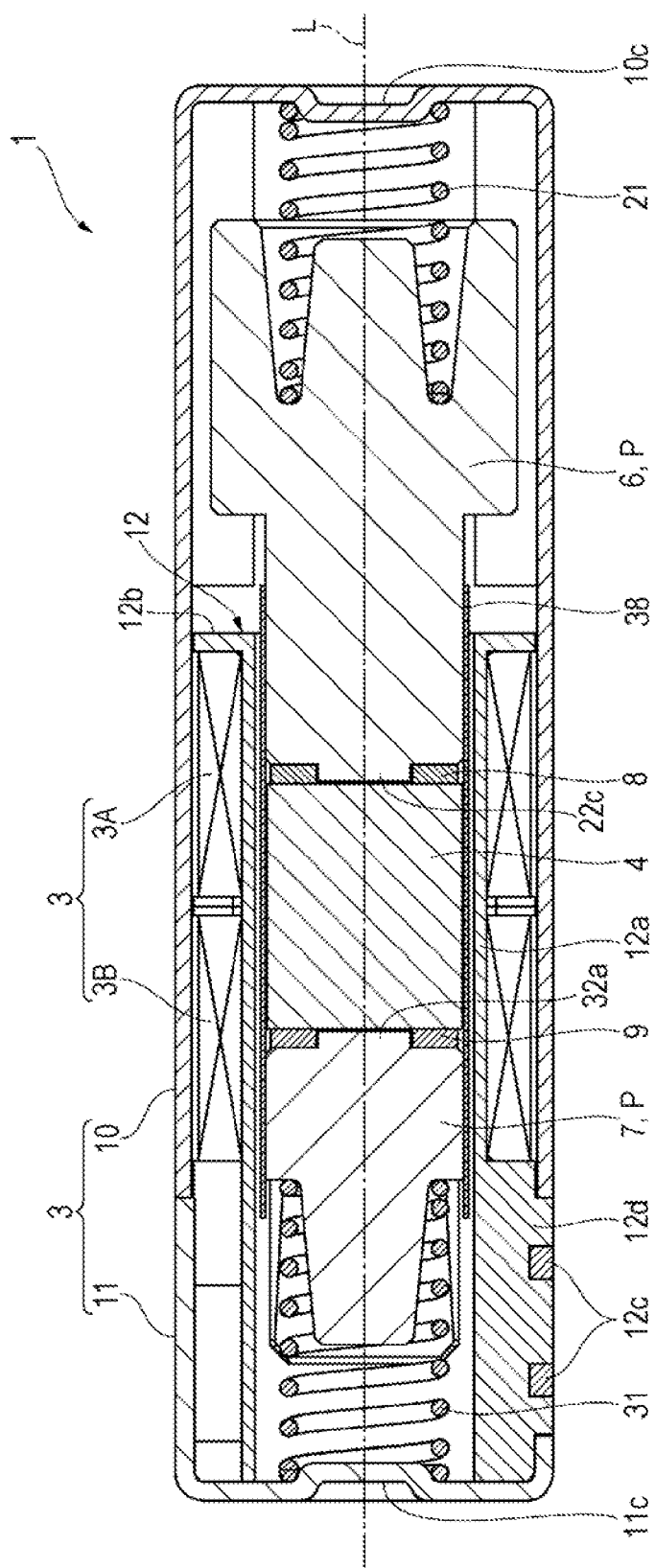
FIG. 3 is a sectional view of the vibration actuator shown in FIG. 1.

As shown in FIGS. 1 to 3, a small vibration actuator 1 includes a parallelepiped housing 2 that has a height of 4 mm, a width of 6 mm, and a length of 15 mm and that is hollow. A coil 3, a parallelepiped magnet 4, a first weight portion 6, a second weight portion 7, a first pole piece 8, and a second pole piece 9 are accommodated in the housing 2 formed of a magnetic material. The coil 3 is formed by being wound around a vibration axis L of the housing 2 into a rectangular shape in cross section. The magnet 4 is surrounded by the coil 3. The first weight portion 6 and the second weight portion 7 are disposed adjacent to corresponding sides of the magnet 4 in a direction of the vibration axis L of the housing 2. The first pole piece 8 and the second pole piece 9 are affixed to corresponding end surfaces of the magnet 4, are annular, and are formed of magnetic materials. The large first weight portion 6 and the small second weight portion 7 constitute a weight P.

The first pole piece 8 is sandwiched by the magnet 4 and the first weight portion 6. The first pole piece 8 is bonded to the magnet 4 and the first weight portion 6 with an adhesive. Similarly, the second pole piece 9 is sandwiched by the magnet 4 and the second weight portion 7. The second pole piece 9 is bonded to the magnet 4 and the second weight portion 7 with an adhesive. In the vibration actuator 1, the magnet 4, which constitutes a mover, the first weight portion 6, and the second weight portion 7 vibrate linearly together along a direction of the vibration axis L of the housing 2 as a result of cooperation of the coil 3 and the magnet 4.

The housing 2 is divided into two portions, that is, a first housing 10 and a second housing 11 in a direction in which the vibration axis L is divided. More specifically, of the portions of the housing 2 that is divided in two, the first housing 10 includes a rectangular end wall 10a and four side walls 10b. The end wall 10a is positioned at an end of the housing 2 in a direction of the vibration axis L. The side walls 10b extend in a direction of the vibration axis L from edges of the end wall 10a. The first housing 10 accommodates the first weight portion 6, the coil 3, and the magnet 4.

The second housing 11 is disposed so as to oppose the first housing 10 in a direction of the vibration axis L. The second housing 11 includes a rectangular end wall 11a and four side walls 11b. The end wall 11a is positioned at the other end of the housing 2 in a direction of the vibration axis L. The side walls 11b extend in a direction of the vibration axis L from edges of the end wall 11a. The second housing 11 accommodates the second weight portion 7. An open-side end portion of the first housing 10 and an open-side end portion of the second housing 11 abut upon each other and are joined to each other by welding. The first housing 10 and the second housing 11 are each formed of a magnetic material, such as Steel Plate Cold Commercial (SPCC). A terminal board 12d, which is part of a resinous bobbin 12, is exposed from a location between the first housing 10 and the second housing 11.

The bobbin 12 is rectangular in cross section and extends in a direction of the vibration axis L. A first coil portion 3A and a second coil portion 3B are disposed side by side and wound around the bobbin 12. The first coil portion 3A and the second coil portion 3B that are adjacent to each other are wound in opposite directions, so that currents flow in opposite directions in a peripheral dimension.

Figure 12:
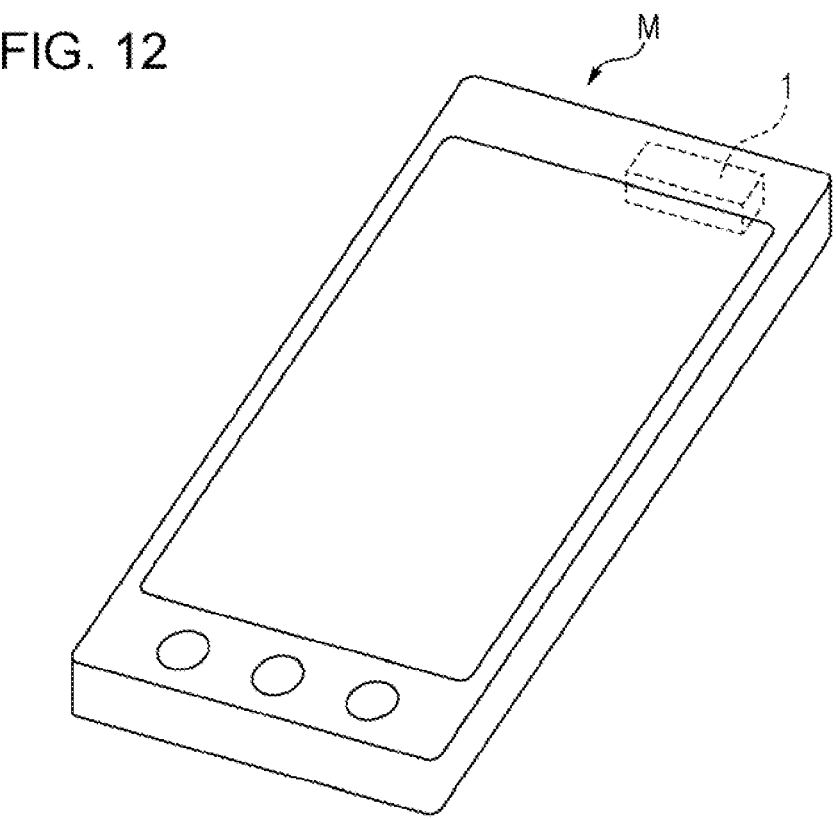
FIG. 12 is an external perspective view of a portable wireless device installed in a vibration actuator according to the present invention.
Figure 13:
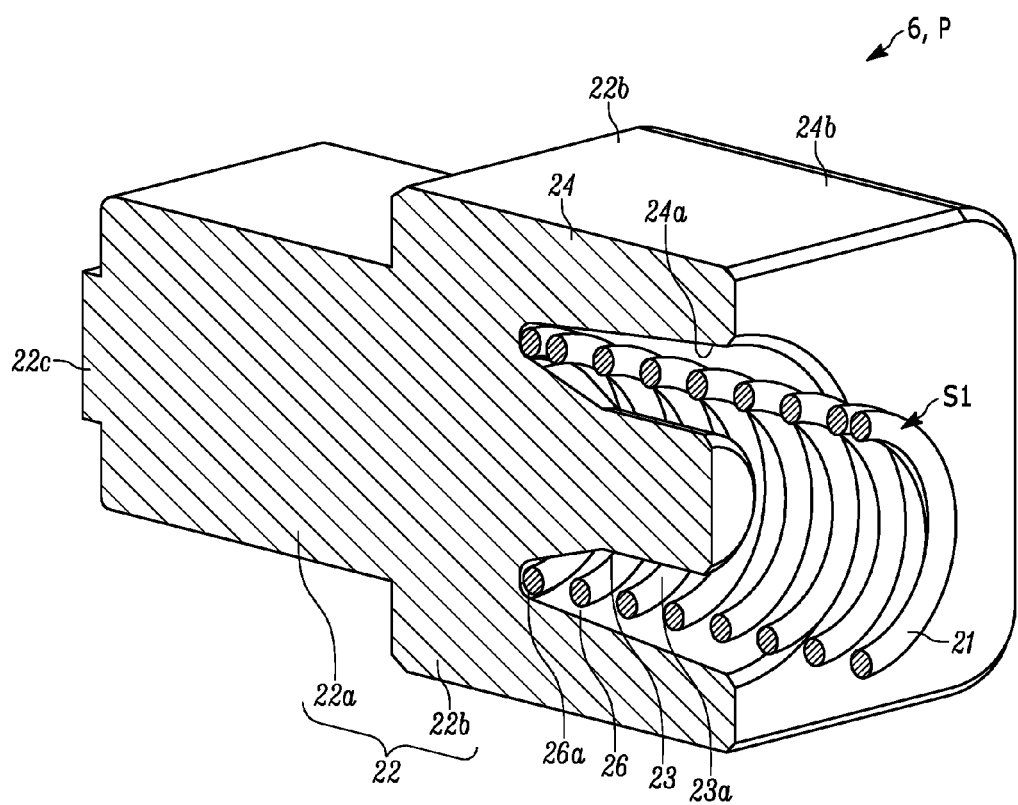
FIG. 13 is a half sectional perspective view of a weight portion according to another embodiment of the present invention.

A cylindrical portion 12a upon which the coil 3 is wound and that is rectangular in cross section is positioned at substantially the center of the housing 2 in a direction of the vibration axis L. A flange 12b that is formed at one side of the cylindrical portion 12a contacts inner surfaces of the side walls 10b of the first housing 10. The terminal board 12d that extends along an outer side of the side wall 1 lb of the second housing 11 is provided at the other end of the cylindrical portion 12a. Terminals 12c for being soldered by reflow to a circuit board that is mounted on a portable wireless device M (see FIG. 12) are buried in the terminal board 12d. By electrically connecting lands of the circuit board and the terminals 12c, electric current is supplied to the coil 3 of the vibration actuator 1 from the portable wireless device M.

Figure 4:
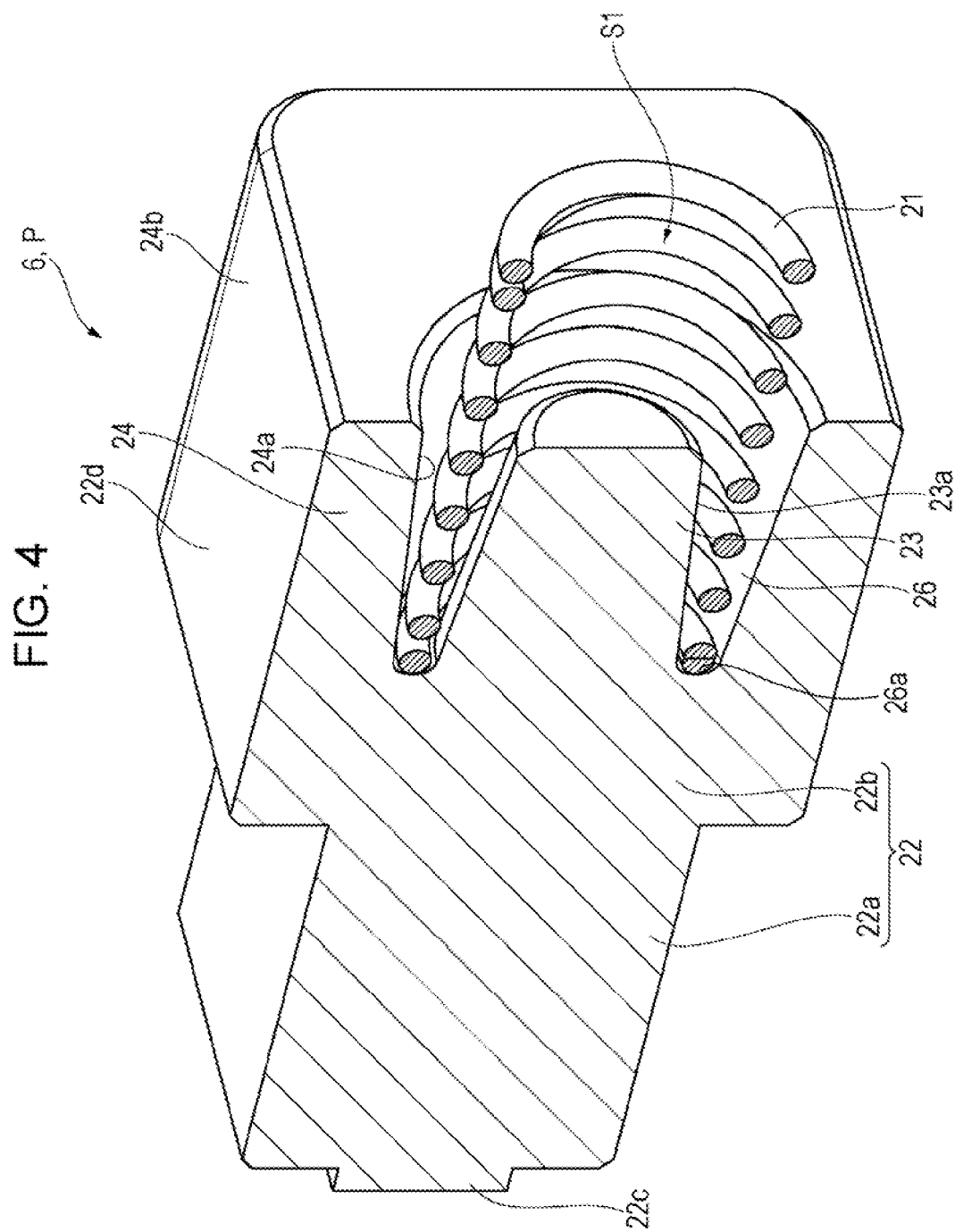
FIG. 4 is a half sectional perspective view of a first weight portion shown in FIG. 1.

As shown in FIG. 4, the first weight portion 6, which constitutes one part of the weight P, includes a weight body portion 22 that is urged by a first compression coil spring 21 that is disposed along the vibration axis L. The weight body portion 22 includes a solid parallelepiped trunk 22a and a solid parallelepiped head 22b. The trunk 22a is inserted into the cylindrical portion 12a (see FIG. 3) of the bobbin 12 and slides along the cylindrical portion 12a in a direction of the vibration axis L. The head 22b is integrated to an end portion of the trunk 22a and is enlarged outward from the trunk 22a. The trunk 22a includes a protrusion 22c that is inserted into a center opening of the annular first pole piece 8.

The first weight portion 6 includes an inner-side enlarged portion 23 that protrudes from an end portion of the solid head 22b in a direction of the vibration axis L and that is inserted into an opening portion S1 extending within the first compression coil spring 21 along the direction of the vibration axis L. An outer peripheral surface 23a of the inner-side enlarged portion 23 becomes continuously smaller in diameter from a base end towards a free end, with the vibration axis L being the center of the diameter. That is, the inner-side enlarged portion 23 has the shape of a truncated cone.

The inner-side enlarged portion 23 is inserted into the opening portion S1 of the first compression coil spring 21 and the opening portion S1 is utilized to change the length of the inner-side enlarged portion 23 in the direction of the vibration axis L, thereby changing the mass of the first weight portion 6. Moreover, considering that the length of the inner-side enlarged portion 23 in the opening portion S1 of the compression coil spring 21 is changed, the inner-side enlarged portion 23 is made smaller in diameter from the base end towards the free end, with the vibration axis L being the center of the diameter. Therefore, even if the first weight portion 6 is made heavy, the first compression coil spring 21 that is repeatedly stretched and contracted when the first weight portion 6 vibrates is less likely to rub against or to collide with the inner-side enlarged portion 23. As a result, the compression coil spring 21 is less likely to generate abnormal noise.

Further, when the first compression coil spring 21 rubs against or collides with the inner-side enlarged portion 23, the amplitude of vibration of the first weight portion 6 is affected, thereby causing the vibration quantity to become changeable. However, such a problem is less likely to occur. In the small vibration actuator 1 including the first compression coil spring 21 having a very small wire diameter, the first compression coil spring 21, itself, is easily twisted. Therefore, the above-described structure is a very effective structure.

Further, the first weight portion 6 includes an outer-side enlarged portion 24 that protrudes from the head 22b of the weight body portion 22 at the outer side of the first compression coil spring 21 in the direction of the vibration axis L. The outer-side enlarged portion 24 extends around the entire periphery of the first compression coil spring 21. An outer peripheral surface 24b of the outer-side enlarged portion 24 is flush with an outer peripheral surface 22d of the head 22b. When such a structure is used, by simply changing the protruding amount of the outer-side enlarged portion 24, it is possible to easily change the mass of the first weight portion 6, and to, coupled with a change in the length of the inner-side enlarged portion 23, considerably increase design flexibility in terms of the mass of the first weight portion 6.

An inner peripheral surface 24a (facing the first compression coil spring 21) of the outer-side enlarged portion 24 becomes continuously larger in diameter from a base end towards a free end, with the vibration axis L being the center of the diameter. When such a structure is used, the compression coil spring 21 that is repeatedly stretched and contracted when the first weight portion 6 vibrates is less likely to rub against or to collide with the outer-side enlarged portion 24 similarly to the case in which it is less likely to rub against or to collide with the inner-side enlarged portion 23. Therefore, the compression coil spring 21 is less likely to generate abnormal noise. Further, when the compression coil spring 21 rubs against or collides with the outer-side enlarged portion 24, the amplitude of vibration of the first weight portion 6 is affected, as a result of which the vibration quantity tends to be changeable. However, such a problem is less likely to occur.

Figure 5:
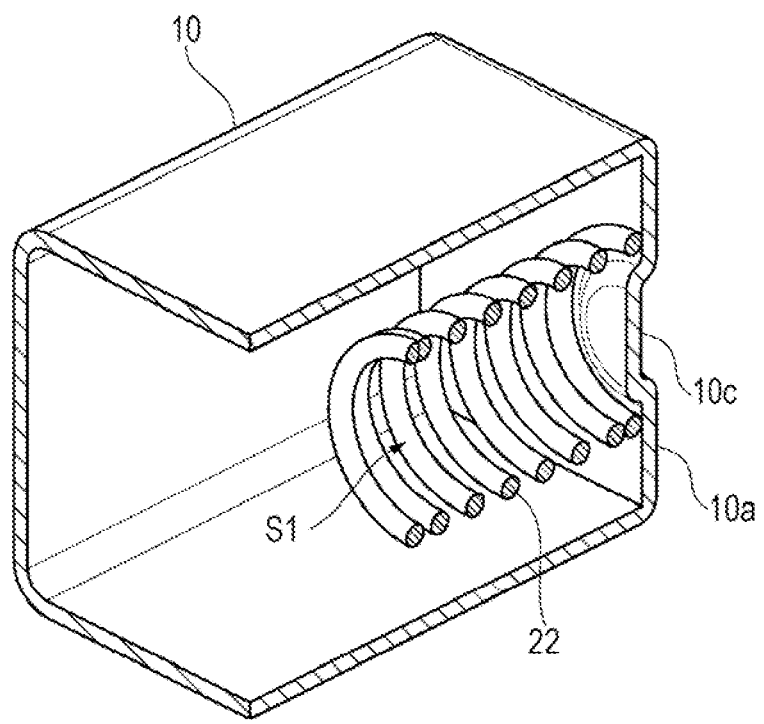
FIG. 5 is a half sectional perspective view of a first housing and a first compression coil spring.

As shown in FIGS. 4 and 5, one end of the first compression coil spring 21 contacts a bottom surface 26a of a spring accommodating recess 26 that is formed between the inner-side enlarged portion 23 and the outer-side enlarged portion 24, and the other end of the first compression coil spring 21 is inserted into a protruding seat 10c that is formed at the center of the rectangular end wall 10a of the housing 10, so that seating stability of the first compression coil spring 21 around the seat 10c is provided.

Figure 6:
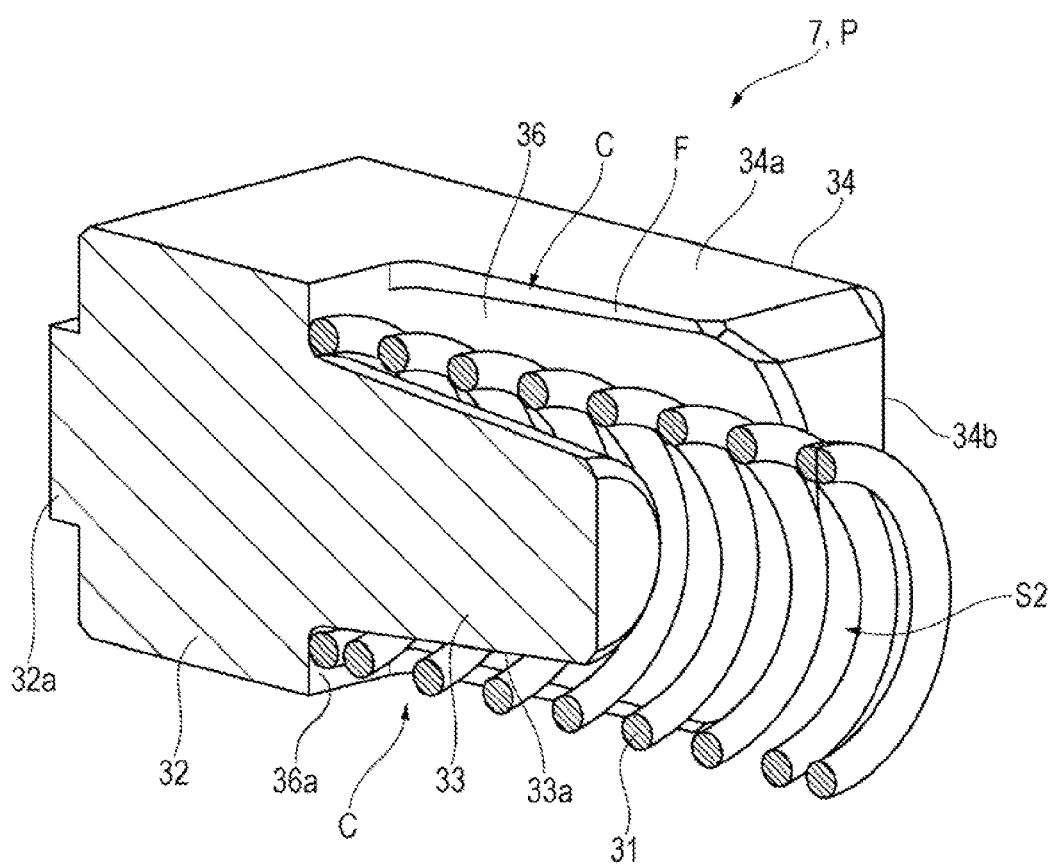
FIG. 6 is a half sectional perspective view of a second weight portion.

As shown in FIG. 6, the second weight portion 7, which is the other part of the weight P, is smaller and lighter than the first weight portion 6. The second weight portion 7 includes a weight body portion 32 that is urged by a second compression coil spring 31 that is disposed along the vibration axis L. The weight body portion 32 is a solid parallelepiped weight body portion that is inserted into the cylindrical portion 12a (see FIG. 3) of the bobbin 12 and slides along the cylindrical portion 12a in a direction of the vibration axis L. The weight body portion 32 corresponds to the trunk 22a of the first weight portion 6. Although a head is not provided at the weight body portion 32 due to the existence of the terminal board 12d, a head may be provided. The weight body portion 32 includes a protrusion 32a that is inserted into a center opening of the annular second pole piece 9.

The second weight portion 7 includes an inner-side enlarged portion 33 that protrudes from an end portion of the solid weight body portion 32 in a direction of the vibration axis L and that is inserted into an opening portion S2 extending in the second compression coil spring 31 along the direction of the vibration axis L. An outer peripheral surface 33a of the inner-side enlarged portion 33 becomes continuously smaller in diameter from a base end towards a free end, with the vibration axis L being the center of the diameter. That is, the inner-side enlarged portion 33 has the shape of a truncated cone. The inner-side enlarged portion 33 provides operation effects that are the same as those of the above-described inner-side enlarged portion 23.

Further, the second weight portion 7 includes an outer-side enlarged portion 34 that protrudes from an end portion of the weight body portion 32 at the outer side of the second compression coil spring 31 in the direction of the vibration axis L. Although the outer-side enlarged portion 34 surrounds the second compression coil spring 31, a portion of the outer-side enlarged portion 34 is cut away. The outer-side enlarged portion 34 includes opposing long-side side surfaces 34a and opposing short-side side surfaces 34b. In order to make it possible to increase the diameter of the second compression coil spring 31, a C-shaped cutaway portion C that extend to opposite positions in a radial direction are formed in the long-side side surfaces 34a. The larger the spring diameter, the more stably the spring is capable of being stretched and contracted. The cutaway portion C reaches a spring accommodating recess 36 that is formed between the inner-side enlarged portion 33 and the outer-side enlarged portion 34 and allows the second compression coil spring 31 to be exposed. Reference character F denotes a chamfered portion around the cutaway portion C. An inner peripheral surface 34c of the outer-side enlarged portion 34 increases continuously in diameter from a base end towards a free end, the vibration axis L being the center of the diameter. The outer-side enlarged portion 34 provides operation effects that are the same as those of the above-described outer-side enlarged portion 24.

As shown in FIG. 2, one end of the second compression coil spring 31 contacts a bottom surface 36a of the spring accommodating recess 36 that is formed between the inner-side enlarged portion 33 and the outer-side enlarged portion 34, and the other end of the second compression coil spring 31 is inserted into a protruding seat 11c that is formed at the center of the rectangular end wall 11a of the housing 11, so that seating stability of the second compression coil spring 31 around the seat 11c is provided.

A cylindrical slider 38 that has a small wall thickness and that is rectangular in cross section surrounds the magnet 4, the trunk 22a of the weight body portion 22 of the first weight portion 6, and the weight body portion 32 of the second weight portion 7, and is secured to the outer surface of the magnet 4, the outer surface of the first weight portion 6, and the outer surface of the second weight portion 7 with an adhesive. Using the cylindrical slider 38 makes it possible to smoothly vibrate the magnet 4, the first weight portion 6, and the second weight portion 7 along an inner surface of the cylindrical portion 12a of the bobbin 12 in a direction of the vibration axis L.

The present invention is not limited to the above-described embodiment, so that various modifications can be made without departing from the gist of the present invention. In describing an embodiment below, structural features that are the same as or equivalent to those of the above-described vibration actuator 1 are given the same reference numerals and are not described below.

Figure 7:
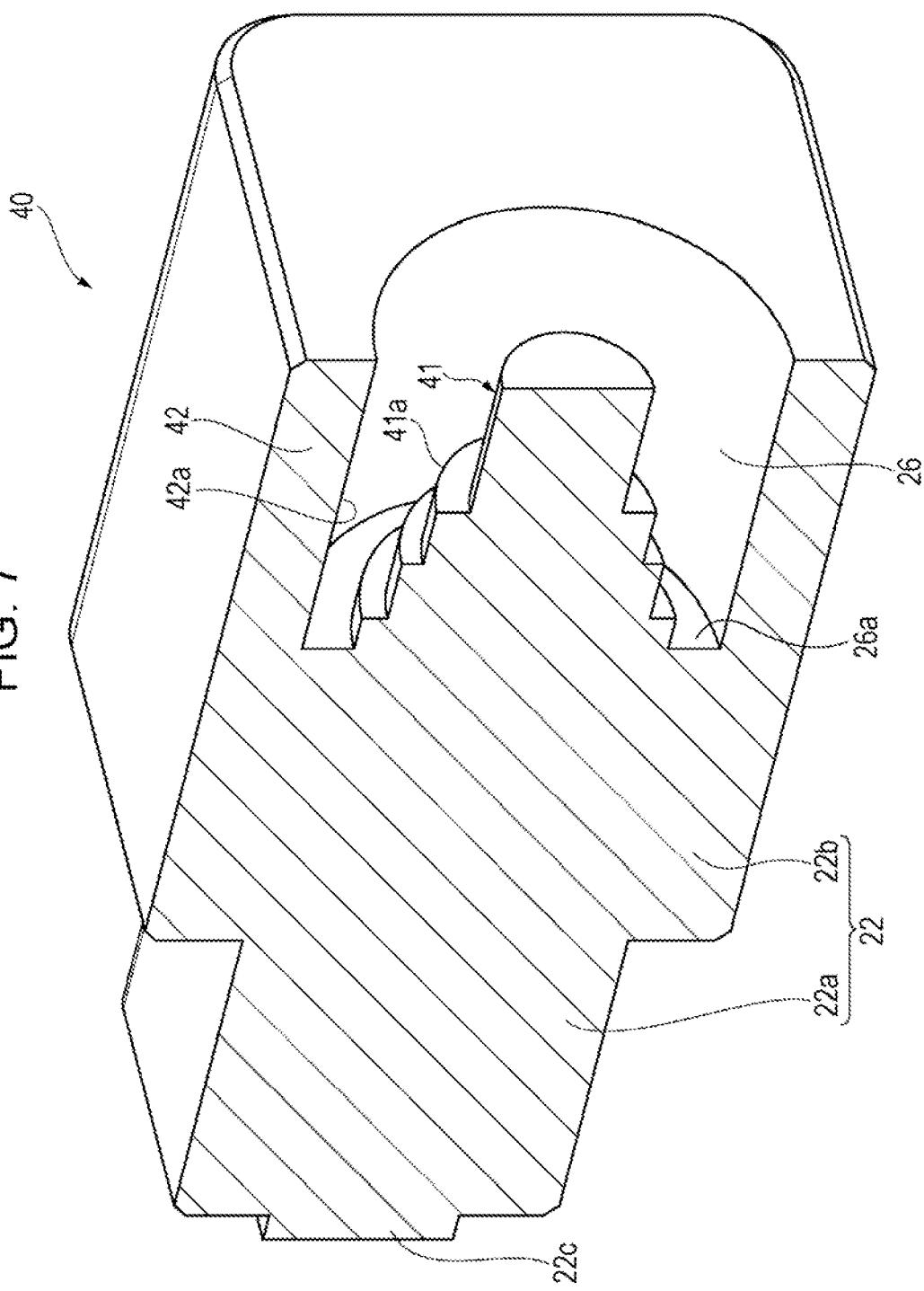
FIG. 7 is a half sectional perspective view of another exemplary first weight portion.

As shown in FIG. 7, in a first weight portion 40, which is a modification, an outer peripheral surface 41a of an inner-side enlarged portion 41 thereof becomes smaller stepwise in diameter from a base end towards a free end, with the vibration axis L being the center of the diameter. An inner peripheral surface 42a of an outer-side enlarged portion 42 extends in a direction of the vibration axis L. Here, in a radial direction that is orthogonal to the vibration axis L, a gap exists between the inner peripheral surface 42a and the first compression coil spring 21. The inner peripheral surface 42a of the outer-side enlarged portion 42 may be made larger stepwise from the base end towards the free end.

Similarly to the second weight portion 7, the first weight portions 6 and 40 may each include a cutaway portion C (see FIG. 6). Alternatively, the second weight portion 7 need not include the cutaway portion C.

Figure 8:
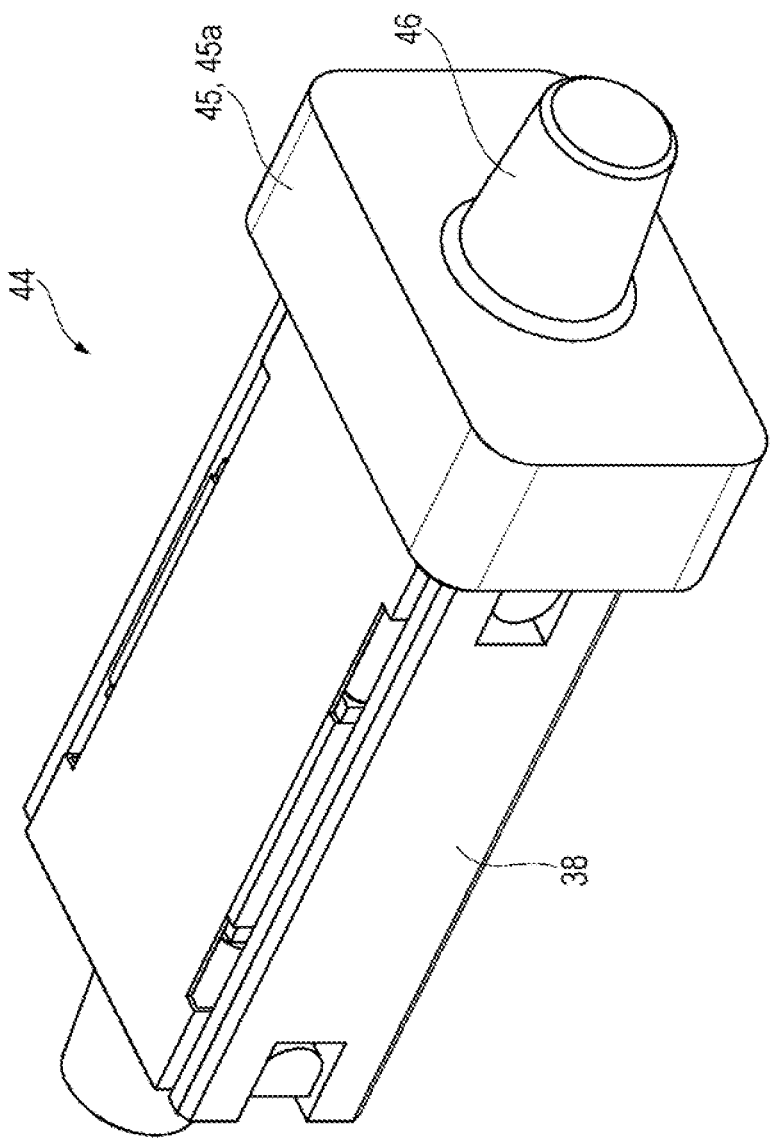
FIG. 8 is a perspective view of still another exemplary first weight portion.

As shown in FIG. 8, in a different first weight portion 44, an inner-side enlarged portion 46 having the shape of a truncated cone is provided at a head 45a of a weight body portion 45, and an outer-side enlarged portion is not provided.

Figure 9:
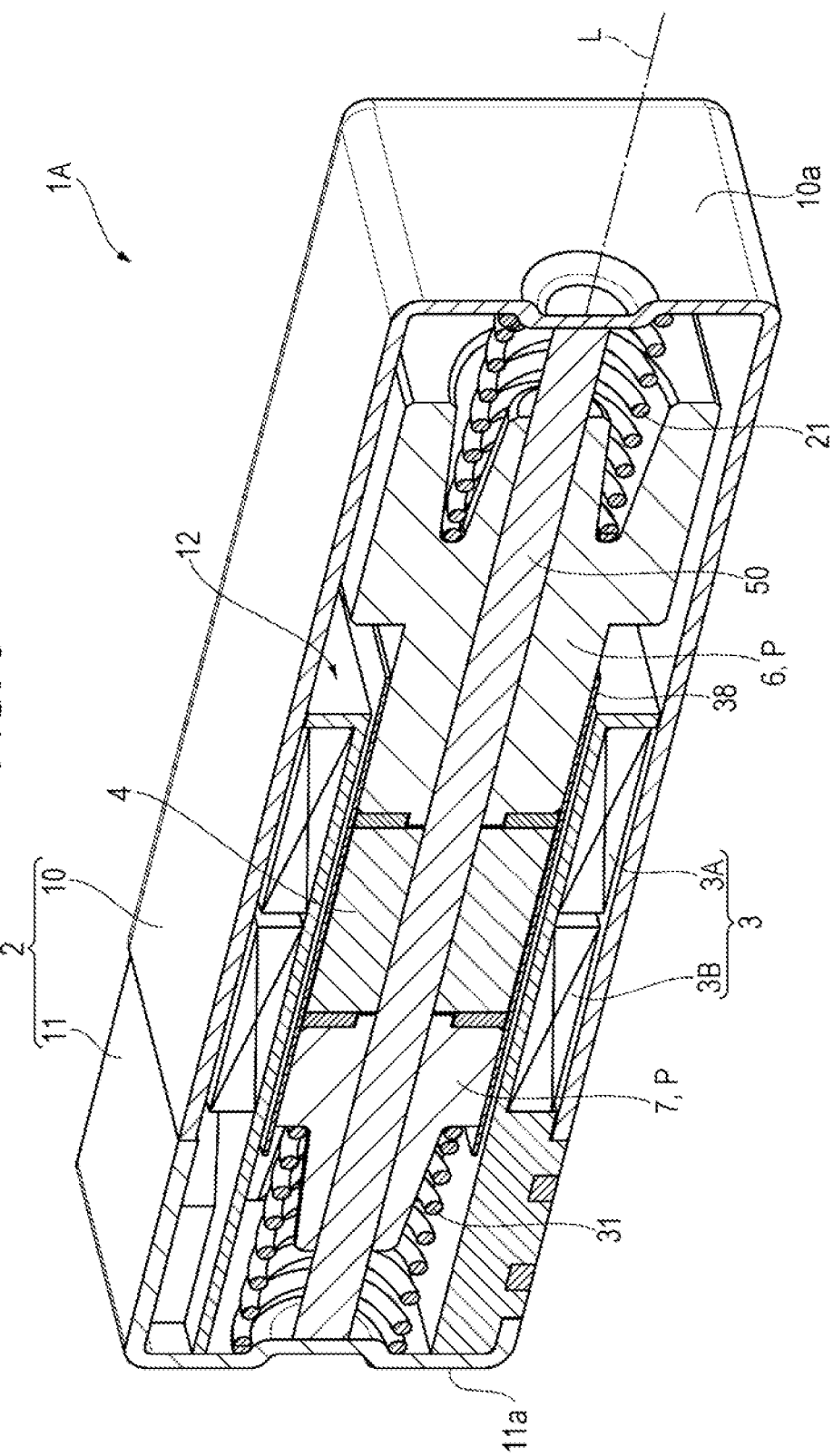
FIG. 9 is a half sectional perspective view of a vibration actuator according to another embodiment of the present invention.

As shown in FIG. 9, a vibration actuator 1A includes a guide shaft 50 that extends through a magnet 4, a first weight portion 6, and a second weight portion 7 in a direction of a vibration axis L. End walls 10a and 11a of a housing 2 are secured to corresponding ends of the guide shaft 50 by welding.

Figure 10:
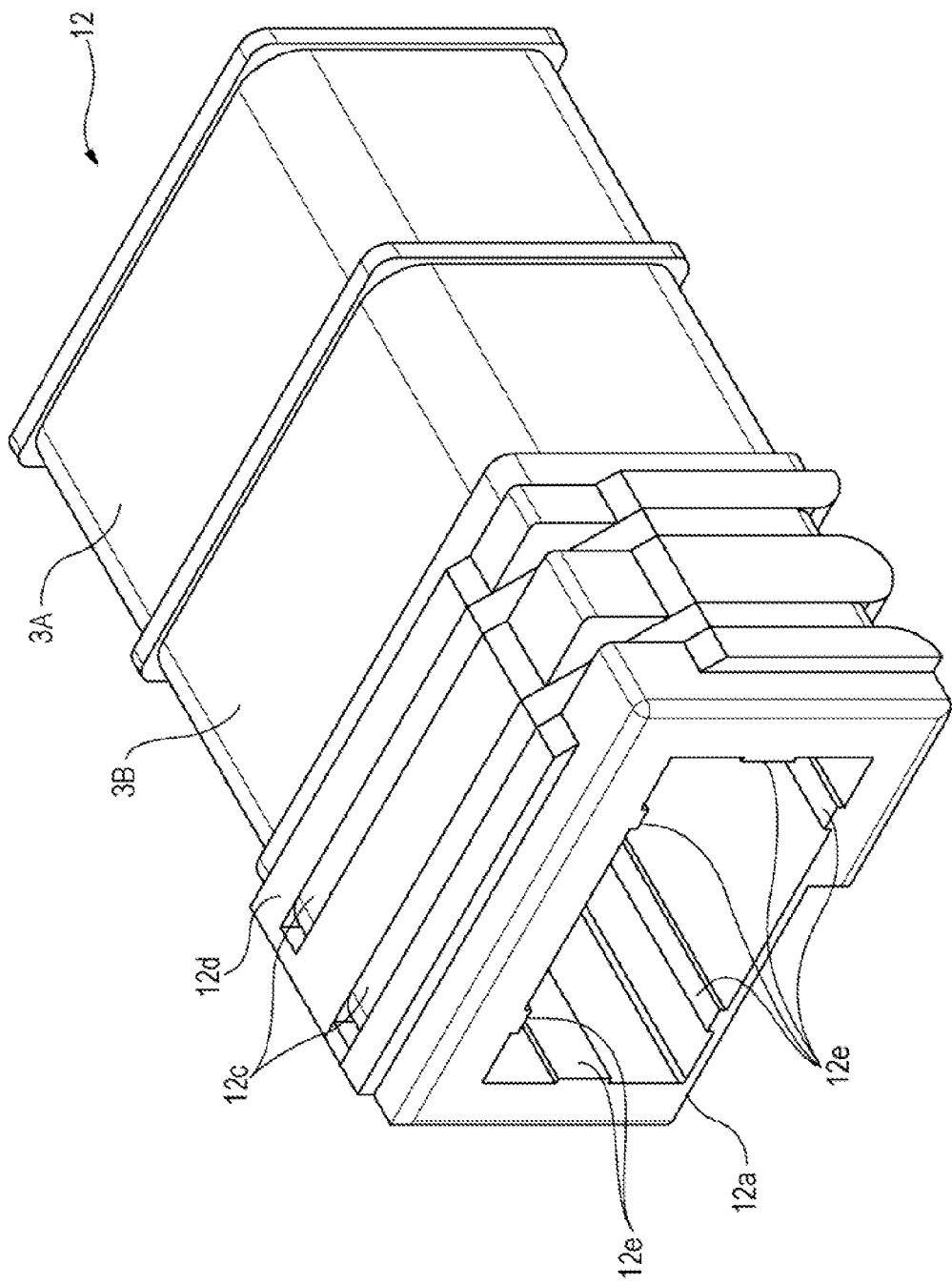
FIG. 10 is a perspective view of another exemplary bobbin.
Figure 11:
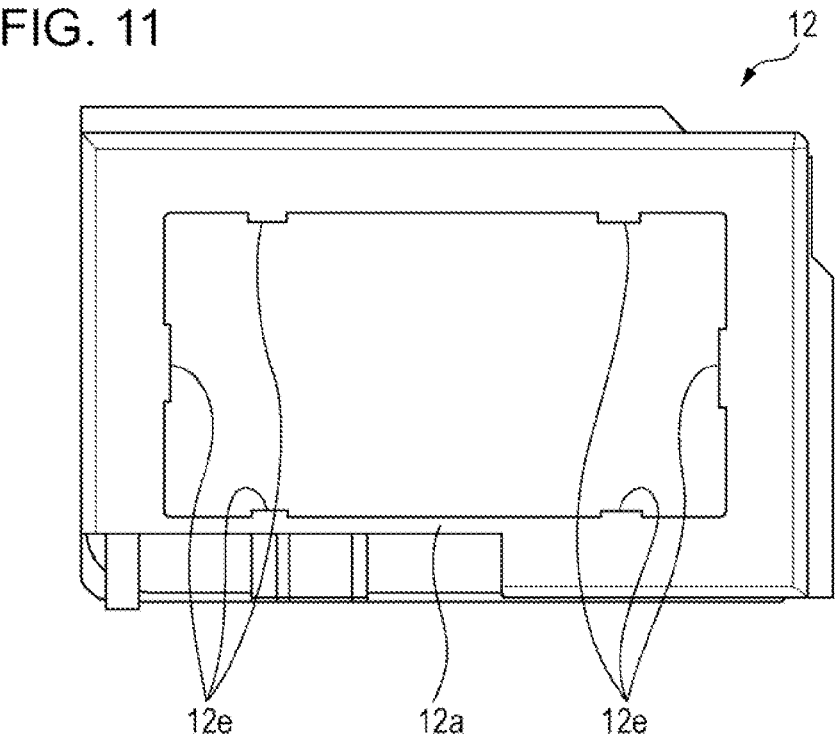
FIG. 11 is a plan view of the bobbin shown in FIG. 10.

As shown in FIGS. 10 and 11, a bobbin 12, which is a modification, includes protrusions 12e that protrude inward from an inner surface of a cylindrical portion 12a. The protrusions 12e extend along a direction of the vibration axis L. When the cylindrical slider 38 to which the magnet 4, the first weight portion 6, and the second weight portion 7 are secured slides along the protrusions 12e, the magnet 4, the first weight portion 6, and the second weight portion 7 can be even more smoothly vibrated in a direction of the vibration axis L. The number of protrusions 12e may be selected as appropriate.

The outer peripheral surface 23a of the inner-side enlarged portion 23 is made continuously smaller from the base end towards the free end so that a gap is formed between it and the first compression coil spring 21 in a radial direction that is orthogonal to the vibration axis L, the outer peripheral surface 33a of the inner-side enlarged portion 33 is made continuously smaller from the base end towards the free end so that a gap is formed between it and the second compression coil spring 31 in a radial direction that is orthogonal to the vibration axis L, and the outer peripheral surface 41a of the inner-side enlarged portion 41 is made smaller stepwise from the base end towards the free end so that a gap is formed between it and the first compression coil spring 21 in a radial direction that is orthogonal to the vibration axis L. However, the following structures are possible. Each of the outer peripheral surfaces 23a and 41a may extend in a direction of the vibration axis L so that a gap is formed between it and the first compression coil spring 21 in a radial direction that is orthogonal to the vibration axis L. The outer peripheral surface 33a may extend in a direction of the vibration axis L so that a gap is formed between it and the second compression coil spring 31 in a radial direction that is orthogonal to the vibration axis L.

What is claimed is:

1. A vibration actuator in which a magnet vibrates linearly in a housing along a vibration axis as a result of cooperation of a coil and the magnet, the vibration actuator comprising:
   the housing;
   the coil that is disposed in the housing;
   the magnet that is surrounded by the coil;
   a first weight portion that vibrates together with the magnet along the vibration axis, the first weight portion including a first weight body portion and a first inner-side enlarged portion, the first weight body portion being urged by a first compression coil spring disposed along the vibration axis, the first inner-side enlarged portion having a conical outer peripheral surface, protruding from the first weight body portion in a direction of the vibration axis, and being inserted into an opening portion extending uninterrupted within the first compression coil spring along the direction of the vibration axis to the housing, wherein the conical outer peripheral surface of the first inner-side enlarged portion becomes continuously smaller in diameter from a base end towards a free end, the vibration axis being a center of the diameter; and a second weight portion that vibrates together with the magnet alone the vibration axis, the second weight portion including:

a second weight body portion being urged by a second compression coil spring disposed along the vibration axis; and a second inner-side enlarged portion having an outer peripheral surface, protruding from the second weight body portion in a direction of the vibration axis, and being inserted into an opening portion extending within the second compression coil spring along the direction of the vibration axis, wherein the outer peripheral surface of the second inner-side enlarged portion becomes smaller in diameter from a base end towards a free end, the vibration axis being a center of the diameter.

2. The vibration actuator according to claim 1, wherein the first weight portion further includes an outer-side enlarged portion that protrudes from the weight body portion at an outer side of the compression coil spring in the direction of the vibration axis.

3. A vibration actuator in which a magnet vibrates linearly in a housing along a vibration axis as a result of cooperation of a coil and the magnet, the vibration actuator comprising:

the housing;

the coil that is disposed in the housing;

the magnet that is surrounded by the coil; and a weight that vibrates together with magnet along the vibration axis, the weight comprising:

a weight body portion urged by a compression coil spring disposed along the vibration axis;

an inner-side enlarged portion having a conical outer peripheral surface, protruding from the weigh body portion in a direction of the vibration axis, and being inserted into an opening portion extending uninterrupted within the compression coil spring along the direction of the vibration axis to the housing; and an outer-side enlarged portion that protrudes from the weight body portion at an outer side of the compression coil spring in the direction of the vibration axis, wherein the outer peripheral surface of the inner-side enlarged portion becomes continuously smaller in diameter from a base end towards a free end as a first step, wherein the outer peripheral surface of the inner-side enlarged portion maintains the smaller diameter from the first sep to the free end, wherein the vibration axis being a center of the diameter, and wherein the outer-side enlarged portion has an inner peripheral surface that becomes larger in diameter from a base end towards a free end, the vibration axis being a center of the diameter, the inner peripheral surface facing the compression coil spring.

4. A vibration actuator in which a magnet vibrates linearly in a housing along a vibration axis as a result of cooperation of a coil and the magnet, the vibration actuator comprising:

the housing;

the coil that is disposed in the housing;

the magnet that is surrounded by the coil; and a weight that vibrates together with the magnet along the vibration axis, the weight including a weight body portion and an inner-side enlarged portion, the weight body portion being urged by a compression coil spring disposed along the vibration axis, the inner-side enlarged portion having an outer peripheral surface, protruding from the weight body portion in a direction of the vibration axis, and being inserted into an opening portion extending uninterrupted within the compression coil spring along the direction of the vibration axis, wherein the outer peripheral surface of the inner-side enlarged portion is progressively smaller in diameter in a plurality of steps from a base end towards a free end, the vibration axis being a center of the diameter.

* * * * *